United States Patent [19]

Ling et al.

[11] Patent Number: 4,512,711

[45] Date of Patent: Apr. 23, 1985

[54] UNLOADING OF GOODS, SUCH AS BULK GOODS FROM A DRIVEN, SUSPENDED LOAD-CARRIER

[75] Inventors: Bernt Ling, Västerås; Mikael Sternad, Upsala, both of Sweden

[73] Assignee: ASEA Aktiebolag, Västerås, Sweden

[21] Appl. No.: 420,379

[22] Filed: Sep. 20, 1982

[30] Foreign Application Priority Data

Sep. 21, 1981 [SE] Sweden ............................... 8105570

[51] Int. Cl.³ ........................ B66C 19/00; B65G 65/00

[52] U.S. Cl. .................................... 414/786; 414/300; 212/132; 212/147; 212/270; 104/89

[58] Field of Search ............... 414/143, 293, 294, 300, 414/786; 104/89; 212/97, 125, 127, 131, 132, 212/146, 147, 270

[56] References Cited

U.S. PATENT DOCUMENTS 3,850,308 11/1974 Meyer et al. ........................ 212/132

3,921,818 11/1975 Yamagishi ........................... 212/132

FOREIGN PATENT DOCUMENTS 1209266 1/1966 Fed. Rep. of Germany .

1273155 7/1968 Fed. Rep. of Germany .

*Primary Examiner*—Joseph E. Valenza
*Assistant Examiner*—David A. Bucci
*Attorney, Agent, or Firm*—Watson, Cole, Grindle & Watson

[57] ABSTRACT

A method for controlling the lateral displacement of a trolley supporting goods to be unloaded at an unloading location, the goods being releasably attached to the trolley by an elongated flexible member. The method is characterized in that the trolley, which supports the goods, via the elongated flexible member during a first phase of the unloading operation, is decelerated from a certain lateral displacement speed at which it approaches the unloading station and, at least after part of the unloading operation of the goods, is accelerated in the opposite direction, whereby the retardation phase and the acceleration phase are invidually carried out within less than one period of the pendulum motion of the elongated flexible member. The method can be used in cases where the length of the flexible member varies during the approach of the goods to the unloading location.

7 Claims, 5 Drawing Figures

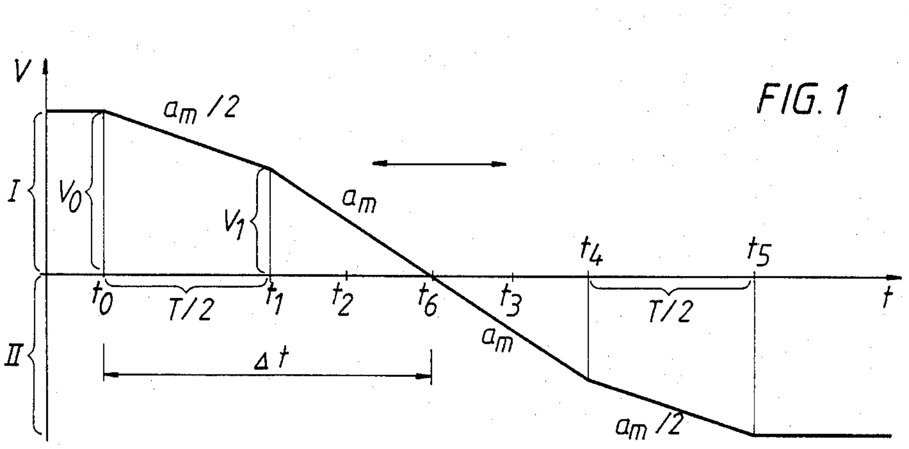
FIG. 1
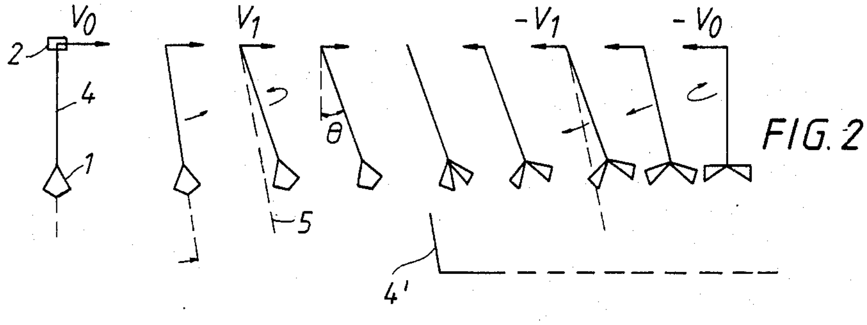
FIG. 2
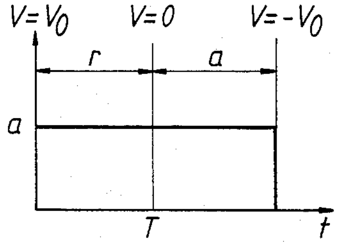
FIG. 3
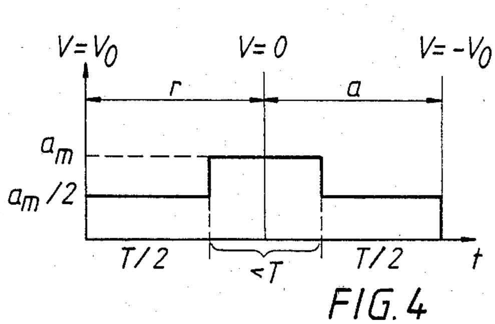
FIG. 4
FIG. 5
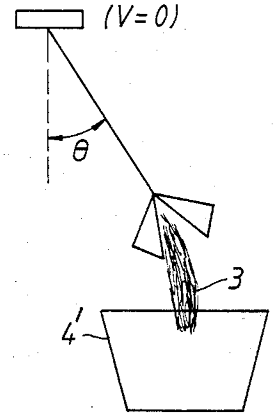

UNLOADING OF GOODS, SUCH AS BULK GOODS FROM A DRIVEN, SUSPENDED LOAD-CARRIER

TECHNICAL FIELD

The present invention relates to a method for automatically controlling the lateral displacement of a trolley supporting goods to be unloaded, the goods being releasably attached to the trolley via an elongated flexible member. The method of the invention allows for the length of the elongated member varying between the points of unloading and loading and permits the pendulum or swinging motion of the goods on the elongated member to be controlled to minimize the time taken to discharge the load at an unloading location.

DISCUSSION OF PRIOR ART

The control of the movement of the trolley to optimize load discharge has often been carried out manually. The trolley is decelerated to rest at the edge of a bunker destined to receive the discharged goods. Owing to the retardation, a grab, or other similar means releasably supporting the goods to be discharged, swings out over the bunker. Immediately after the trolley comes to rest, the trolley is accelerated away from the bunker. The bulk goods are thus discharged during the final phase of the deceleration and the initial phase of the acceleration. The operator attempts to manually reduce the pendulum motion of the elongated flexible member, which occurs during the acceleration, by means of the crane control, so that at the end of this acceleration (i.e. when the trolley is moving away from the bunker at the required transport speed), the flexible member is vertical and has zero angular velocity. This requires great proficiency on the part of the operator and may be difficult for even an experienced operator to perform in the face of a variety of different external conditions.

It is known in the art to use the following method of changing the velocity of the trolley automatically to suppress the swinging motion of the flexible member during the load discharging phase:

The retardation of the trolley is arranged to take place during one pendulum period (T) of the load ($T \simeq 2x\sqrt{l}$, where l is the length of pendulum motion in meters). When the trolley has come to rest, typically in the center of the bunker, the pendulum motion of the flexible member has been removed, and then load discharge occurs while the trolley is stationary. Finally the trolley is accelerated away from the bunker during the time T.

The manual method results in an unreliable suppression of the pendulum motion, but can in practice be relatively time efficient. The method mentioned in the preceding paragraph results in an efficient suppression of the pendulum motion of the elongated flexible member, but at the cost of a great time loss.

BRIEF STATEMENT OF INVENTION

It is an object of the invention to provide a method of driving the trolley during the load discharging operation which is fast and which permits full control to be exercised over the pendulum motion of the flexible member.

According to the invention there is provided a method for controlling the lateral displacement of a trolley supporting goods to be unloaded, the goods being releasably attached to the trolley via an elongated flexible member and released from said flexible member at an unloading location following deceleration of the trolley, wherein a trolley moving towards the unloading location with the flexible member extending vertically is decelerated to rest and is thereafter immediately accelerated in the opposite direction, the lateral displacement of the trolley being controlled in such a way that (a) the elongated flexible member has an angle of deflection ($\theta$) from the vertical which is different from zero and is directed forwardly towards the unloading location and an angular velocity which is substantially equal to zero at the moment of velocity reversal of the trolley, and that (b) the elongated flexible member is substantially vertical with a substantially zero angular velocity at the conclusion of the acceleration.

The method of the invention thus provides an automatic way of driving the trolley, which ensures that the deceleration and acceleration of the trolley are effected very rapidly. The pendulum motion of the elongated flexible member at the end of the deceleration is controlled and utilized for swinging the load out towards the unloading location (e.g. a bunker) during the load discharge operation. Further, the method of the invention eliminates the load pendulum motion at the conclusion of the acceleration away from the unloading location, and this takes place without it being necessary to directly measure the load pendulum motion. The suspended load is often raised or lowered simultaneously with the lateral displacement of the trolley. The control of the load pendulum motion according to the method of the invention can operate when the length of the elongated flexible member is varied during the deceleration and/or acceleration phases.

In a preferred embodiment, substantially half the deceleration of the trolley is applied during a first phase of the unloading movement. When the angular velocity of the flexible member is substantially zero, full deceleration is applied to the trolley. During this latter phase, the unloading of the goods is commenced. The trolley is reversed with full acceleration and then with half acceleration in a corresponding manner. This results in a quick unloading of the goods and good suppression of the pendulum motion of the flexible member during the unloading. The motion of the trolley is conveniently controlled with the aid of a computer.

BRIEF DESCRIPTION OF DRAWING

The invention will now be exemplified in greater detail, by way of example, with reference to the accompanying drawing, in which:

FIG. 1 shows a velocity/time graph showing one method in accordance with the invention for the control of the trolley during an unloading operation, FIG. 2 shows, purely schematically, the disposition of the trolley and its suspended load at different stages during the unloading method shown in FIG. 1, FIGS. 3 and 4 show two different accleration/deceleration schemes in accordance with the invention, both plotted as accleration/deceleration versus time graphs, and FIG. 5 schematically illustrates load discharge in carrying out the method of the invention.

DESCRIPTION OF PREFERRED EMBODIMENT

FIG. 2 shows a grab 1 suspended by ropes 4 from a trolley 2, the trolley 2 being adapted for horizontal movement (e.g. along a gantry—not shown—of an overhead travelling crane). The trolley 2 in the initial position shown in FIG. 2, moves at a speed $V_0$ to the right towards a bunker 4'. In this initial position, the load is suspended vertically below the trolley 2. The ropes 4 are assumed to be of a constant length throughout the movement shown in FIG. 2. The invention is not, however, limited to this requirement.

Referring now to FIG. 1, at a time $t_0$ (see the graph of FIG. 1 shown with the time scale (t) along the x axis and trolley speed V shown along the y axis), retardation of the trolley is commenced with half the maximum deceleration of the crane (or half the amount of the desired final deceleration), $a_m/2$, and this deceleration causes a forward swinging motion of the loaded grab 1.

When the time T/2 has elapsed (T being the natural period of pendulum motion $$= 2\pi \times \sqrt{\frac{1}{g}}$$

for small angles of swing $\theta$, where l is the length of the ropes and g is the acceleration due to gravity hereinafter $T=2\times\sqrt{l}$ where T is in seconds and l is in meters) the time $t_1$ has been reached. The ropes 4 (or just one rope) have then swung past their position of equilibrium (the dash line 5 in FIG. 2) and are precisely at the turning position of the pendulum motion of the ropes (i.e. the angular velocity =0). The deceleration of the trolley 2 is now increased to its full value, $a_m$, and the position of equilibrium of the pendulum motion will then coincide with the position of the ropes, and since the angular velocity at this moment is zero all pendulum motion has disappeared. As stated above the length of the ropes 4 has been assumed to be constant throughout; however, if the length of the ropes varies, this must be taken into consideration (as described hereafter) when calculating the abovementioned time interval T/2.

From time $t_1$ to time $t_4$ the speed of the trolley changes from $+V_1$ (at $t_1$) to $-V_1$ (at $t_4$) as a consequence of the constant deceleration/acceleration $a_m$. The speed $-V_1$ for the movement of the trolley away from the bunker 4' is thus reached at the time $t_4$. During the interval $t_1$-$t_4$, the swing angle of the ropes and the grab 1 is constant at $\theta=\arctan(a_m/g)$. During the interval $T_4$-$t_5$=T/2, acceleration of the trolley away from the bunker 4' is performed with an acceleration $a_m/2$. After the time $t_5$ the trolley 2 is moving away from the bunker 4' at a constant speed $-V_0$ without any pendulum motion of the ropes 4 or the grab 1. During a time interval $t_2$-$t_3$, when the trolley speed is near zero, the load is released. This is discussed further below.

Since the rope is inclined to the vertical (at the angle $\theta$) and is directed inwardly towards the bunker during discharge of the load, the point at which the trolley reverses its direction of motion (the turning point) can be situated at a small distance upstream of the front edge of the bunker 4'. (i.e. as shown in FIG. 5).

The braking distance of the trolley with this method of retardation can be shown to be $$S = \int_{t_0}^{t_6} V dt = \frac{V_0\sqrt{1}}{2} - \frac{a_m \times 1}{8} + \frac{V_0^2}{2a_m}$$

The distance of the trolley to the pre-selected turning point is called X. This distance is continuously measured. When the trolley has moved a distance such that X=S, the deceleration of the trolley commences. The time $t_0$ has then been reached. The time from $t_0$ to the turning point $t_6$ may be shown to be $$\Delta t = \frac{V_0}{a_m} + \frac{\sqrt{1}}{2}$$

The time during which the deceleration is at its maximum value is $$t_6 - t_1 = \frac{V_0}{a_m} - \frac{\sqrt{1}}{2}$$

The method also provides a possibility of accelerating the trolley away from the bunker, in a manner which suppresses the pendulum motion at the end of the acceleration. If the final speed of the trolley is $V_5$ (which is different from the original approach speed, $V_0$, of the trolley), the times $t_4$ and $t_5$ can then be determined from the following equations:

$$t_5 - t_6 = \frac{V_5}{a_m} + \frac{\sqrt{1}}{2}$$

$$t_4 - t_6 = \frac{V_5}{a_m} - \frac{\sqrt{1}}{2}$$

This method can be supplemented with a strategy for determining the time ($t_2$-$t_3$) when the grab is to be open. This is important as it ensures that the bulk goods will always fall into the bunker 4'.

$t_6$ reduced by half is the time required for full discharge of goods from the grab, and this is a readily measurable value. The grab is then at $t_2$, when discharge of the goods commences. At time $t_3$ discharge of goods from the grab is completed. Some margin for error in the discharge time should be allowed for, i.e. at the time $t_3$ it is desirable that the grab should still be somewhat downstream of the upstream bunker edge.

The invention also includes a second method for controlling the lateral displacement of the trolley. This is illustrated in FIG. 3. The trolley is first retarded with a deceleration of $-a$, and when it has come to rest after a time T/2 it is accelerated back to full speed in the opposite direction with the same value a. Since $T/2=\sqrt{l}$, the constant deceleration/acceleration $a=V_0/\sqrt{l}\leqq a_m$. The goods are emptied when the trolley speed is approximately equal to zero. Acceleration and deceleration both at a constant value, both take place during a time $t=2\sqrt{1}$.

FIG. 4 shows a schematic representation of the first-mentioned embodiment of the method shown in FIG. 1. It is possible to calculate which of the two methods (FIG. 3 or FIG. 4) is the more efficient. When $$\sqrt{1} \geqq \frac{V_0}{a_m},$$

the embodiment according to FIG. 3 should be used, and when $$\sqrt{1} < \frac{V_0}{a_m},$$

the embodiment according to FIG. 4 and FIG. 1 should be used. Deciding on the method of trolley control on the basis of the above criteria makes it possible to choose the most time efficient method.

The distance from the start of the control at the speed $V_0$ to the turning point of the trolley may, in the method according to FIG. 3, be determined to be $$V_0 \times \frac{\sqrt{1}}{2},$$

and the time up to the turning point can be determined to be $\sqrt{1}$.

The length of the elongated flexible member(s) 4 is not always constant throughout the unloading operation. A lifting operation frequently occurs simultaneously with movement of the trolley 2, and the end of the lifting phase may coincide with the beginning of the deceleration of the trolley on its approach to the bunker 4'. The methods described above can be adapted to accommodate variable rope lengths in several ways. Two possibilities are:

(1) The value for l in the equations may be replaced by the mean value of the length of the ropes.

(2) The lateral displacement of the trolley can be controlled by a computer which contains a mathematical model of a swinging grab. This model is used to simulate the swinging motion which will occur with the rope lengths which will be used in practice. The period of swinging motion for this simulated swinging motion ($T_s$) is measured, and $$\left(\frac{T_s}{2}\right)^2$$

can then be used in the equations as an estimated value of the rope length.

For this purpose, the following linearized model for simulation of load pendulum motion can be used:

$$\ddot{\theta}(t) = \frac{-l}{l(t)}\left(2\dot{l}(t)\dot{\theta}(t) + a(t) + g\theta(t)\right)$$

$$\dot{\theta}(t+h) = \dot{\theta}(t) + h\ddot{\theta}(t)$$

$$\theta(t+h) = \theta(t) + h\dot{\theta}(t+h)$$

$$l(t+h) = l(t) + h\dot{l}(t)$$

where h is the time step, $\theta$, $\dot{\theta}$, $\ddot{\theta}$ are the angle of pendulum swing, angular velocity of the rope(s) and angular acceleration of the rope(s), respectively, l is the instantaneous length of the rope(s), $\dot{l}$ is the rate of change of the length of the rope(s), a is the trolley acceleration, and g is the acceleration due to gravity.

The method described above can be varied in many ways within the scope of the following claims.

What is claimed is:

1. A method for controlling the lateral displacement of a trolley supporting goods to be unloaded, the goods being releasably attached to the trolley via an elongated flexible member and released from said flexible member at an unloading location during deceleration of the trolley, comprising moving the trolley laterally in one direction towards the unloading location with the flexible member extending vertically, decelerating the trolley to rest in a first and second deceleration steps, the first deceleration step having approximately half the deceleration of the second step, the flexible member having an angular velocity of about zero and a certain angle of deflection from vertical after said second deceleration step, releasing said goods from said flexible member during said second deceleration step, immediately accelerating the trolley in the opposite direction in first and second acceleration steps, the first acceleration step having approximately twice the acceleration of the second acceleration step, the flexible member being approximately vertical with approximately zero angular velocity after said second acceleration step.

2. A method according to claim 1, including the step of effecting the unloading during the final phase of the second deceleration step.

3. A method according to claim 2 or claim 1 including the steps of effecting the deceleration at a constant deceleration and effecting the acceleration at a constant acceleration and in such a way that the total times for acceleration and deceleration are substantially equal to the periodicity of pendulum swing $T = 2\pi\sqrt{l/g}$ of the pendulum constituted by the suspended grab.

4. A method according to claim 1, in which $$\sqrt{1} < \frac{V_0}{a_m},$$

where l is the length of the elongated member, $V_0$ the speed of the trolley towards the unloading location at the commencement of the deceleration of the trolley, and $a_m$ is the maximum acceleration/deceleration of the trolley.

5. A method according to claim 3, in which $$\sqrt{1} \geqq \frac{V_0}{a_m},$$

where l is the length of the elongated member, $V_0$ the speed of the trolley towards the unloading location at the commencement of the deceleration of the trolley, and $a_m$ is the maximum acceleration/deceleration of the trolley.

6. A method according to claim 1, including the step of computing the mean length of the elongated member (l) in such a way by supplying a control computer with a mathematical pendulum model of the values of the lengths of the elongated member which will be used during the unloading operation, and the control computer allows the pendulum model to simulate a pendulum motion, whereupon l is computed from the period $T_s$ of this pendulum motion through the equation l=

$$\frac{(T_s)}{2}\,2.$$

7. A method according to claims 2 or 1, wherein said first and second deceleration steps are of a time period $\Delta t_1$ and said first and second acceleration steps are of a time period $\Delta t_2$ as defined by:

$$\Delta t_1 = \frac{V_0}{a_m} + \sqrt{\frac{1}{2}} \text{ and } \Delta t_2 = \frac{V_5}{a_m} + \sqrt{\frac{1}{2}}$$

where $a_m$ is the maximum acceleration/deceleration of the trolley, $V_0$ is the maximum speed of the trolley toward the unloading location, $V_5$ is the speed of the trolley away from the unloading location at the end of the acceleration, and l is the mean length of the elongated flexible member during the combined deceleration/acceleration steps.

* * * * *